May 30, 1944. N. FRAGEN 2,349,821
CATALYTIC CONVERSION PROCESS
Filed Dec. 15, 1941
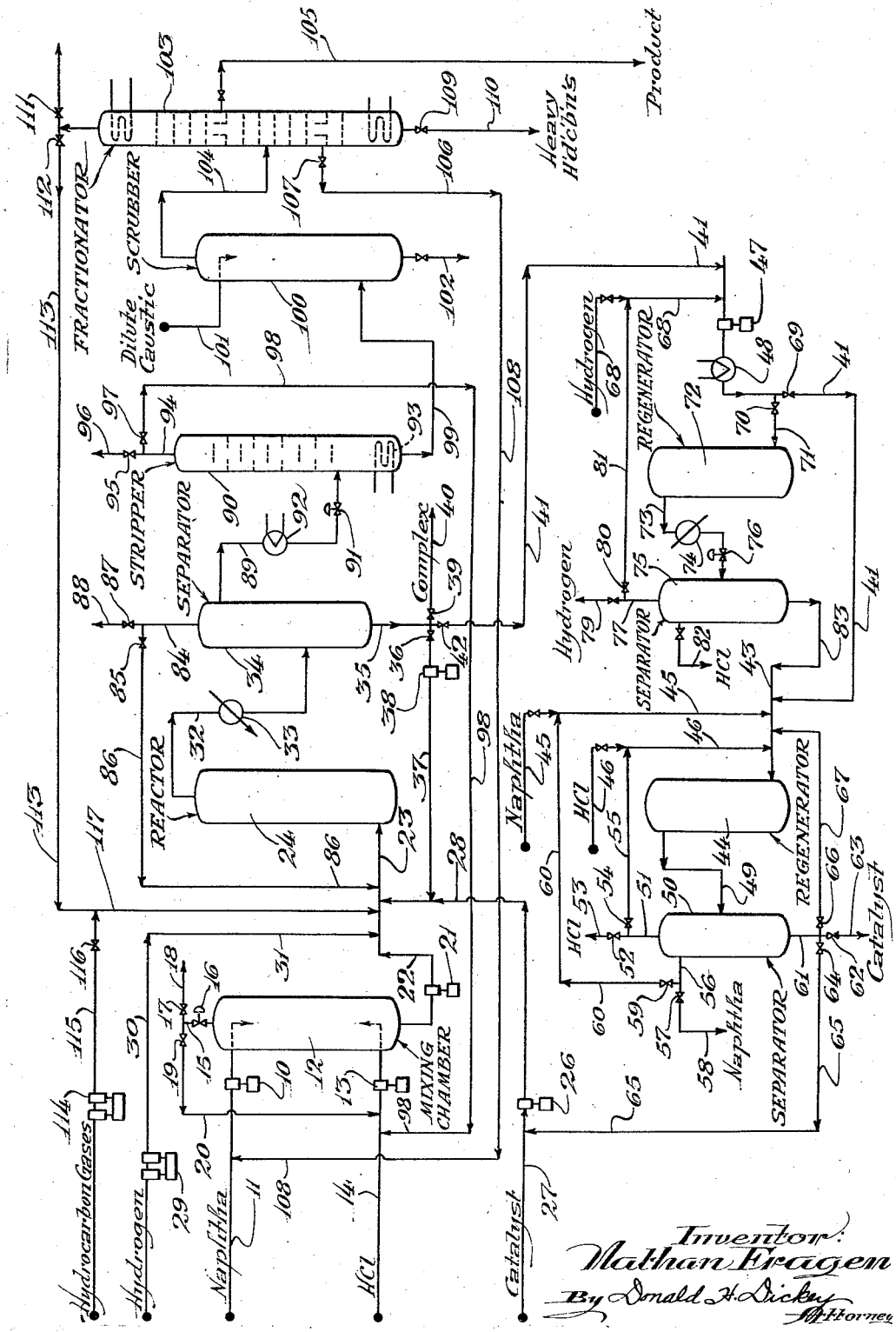

Patented May 30, 1944

2,349,821

UNITED STATES PATENT OFFICE 2,349,821

CATALYTIC CONVERSION PROCESS

Nathan Fragen, Hammond, Ind., assignor to Standard Oil Company, Chicago, Ill., a corporation of Indiana Application December 15, 1941, Serial No. 422,977

6 Claims. (Cl. 260—683.5)

This invention relates to the catalytic conversion of hydrocarbons and more particularly to a process for the conversion of hydrocarbons involving the use of an active aluminum halide catalyst. Still more specifically it relates to a conversion process of the type in which the catalyst is an active liquid aluminum halide-hydrocarbon complex having an exceptionally long life and capable of frequent and effective regeneration.

It is well-known that the branched-chain paraffin hydrocarbons and naphthas containing them in substantial proportions are very valuable as motor fuels and particularly as aviation engine fuels because of their high antiknock values, freedom from gum-forming tendencies and high heat content per unit weight of fuel. It has been proposed to produce such naphthas from substantially saturated liquid fractions which are rich in straight-chain paraffin hydrocarbons by the action of aluminum chloride or other active aluminum halide catalysts in the presence of an activator such as hydrogen chloride.

In carrying out the conversion of straight-chain paraffin hydrocarbons to branched-chain paraffin hydrocarbons on a refinery scale it is extremely advantageous that the process be continuous and this fact makes it very desirable to have the catalyst in liquid form, so that it can be pumped readily through pipes, tubes and other apparatus. It has, of course, long been known that aluminum chloride in the presence of a hydrocarbon such as an olefinic or aromatic hydrocarbon under conversion conditions will gradually, and sometimes very rapidly, be converted into an aluminum chloride-hydrocarbon complex which is a liquid and retains a portion of the activity of the original aluminum chloride. However, such complexes are rapidly degraded under the usual reaction conditions to an inactive sludge and this degradation has been a major factor in limiting the commercial use of aluminum chloride in hydrocarbon conversion processes.

Hydrocarbon conversion processes, and particularly the production of branched-chain paraffin hydrocarbons from straight-chain paraffin hydrocarbons can be carried out most effectively in the presence of an active liquid aluminum halide-hydrocarbon complex produced by the action of an aluminum halide such as anhydrous aluminum chloride on paraffin hydrocarbons, and particularly branched-chain paraffin hydrocarbons, in the presence of an activator such as hydrogen chloride at a relatively low temperature, and that such complexes exhibit the unexpected property of increasing in activity with use. Such complexes, however, become highly viscous after continued use and therefore are not easily pumpable although their activity so far as hydrocarbon conversion processes are concerned is as great or greater than that of freshly prepared complex.

It is an object of my invention to provide an economical hydrocarbon conversion process particularly adapted to the production of high antiknock motor fuel fractions in the presence of an unusually effective liquid aluminum halide-type catalyst. Another object is to provide a process whereby naphthas having low antiknock values due to the high content of straight-chain paraffin hydrocarbons are converted into high antiknock motor fuel fractions in the presence of an active aluminum halide catalyst derived from paraffin hydrocarbons. It is also an object of my invention to provide a process of the continuous type in which a liquid aluminum halide-hydrocarbon complex which has become relatively ineffective for promoting the hydrocarbon conversion reaction is regenerated easily and economically. Other objects, advantages and uses of my invention will appear from the following detailed description thereof read in conjunction with the drawing, which forms a part of this specification, and which shows in a schematic manner an apparatus suitable for carrying out my invention.

The active liquid aluminum halide-hydrocarbon complex used in acordance with my invention is prepared by the action of an aluminum halide, such as anyhydrous aluminum chloride or aluminum bromide, and an activator affording a hydrogen halide on a substantially saturated fraction containing predominantly at least one paraffin hydrocarbon, at a temperature in the range from about 50° F. to about 225° F. Preferably this liquid catalyst complex is prepared from aluminum chloride and a substantially saturated fraction containing paraffin hydrocarbons having at least six carbon atoms per molecule and advantageously possessing at least two side chains. Suitable saturated fractions are, for example, the hydrogenated polymers and copolymers of olefins having less than six carbon atoms per molecule, namely, the polymers and copolymers of ethylene, propylene and the butylenes and amylenes, and the products of alkylation of isobutane and of isopentane with olefins of the class described. These fractions are very rich in highly branched paraffin hydrocarbons, the hydrogenated polymers of isobutylene, for example, being rich in so-called isooctane (2,2,4-trimethylpentane). While certain alkylation products also contain this and other similar hydrocarbons, I prefer to prepare my complex from a fraction rich in isooctane, although less volatile fractions rich in hydrogenated trimers and even heavier polymers of isobutylene are also effective in producing the desired complex. It is also possible to prepare my catalyst from any paraffinic hydrocarbon or mixture containing such hydrocarbons. A light naphtha from natural or straight-run gasoline substantially free of aromatic and olefinic hydrocarbons is eminently suitable, and one having an end point below about 158° F. and thus substantially free of aromatics and heptanes, is particularly desirable for my purposes.

In one case an aluminum chloride-hydrocarbon complex was prepared by stirring together at atmospheric pressure a quantity of anhydrous aluminum chloride with an excess of commercial isooctane and a minor amount of hydrogen chloride at 120° F. to 140° F. until a liquid complex resulted. During the complex formation large amounts of isobutane were produced and the remaining hydrocarbon liquid contained 50% of material boiling higher than the end point of the original isooctane. This heavy material is suitable for safety fuel while the isobutane can be utilized readily in an alkylation process, for example. The complex itself was decanted from the unreacted aluminum chloride, which can be ultimately converted in its entirety to the complex by further treatment with additional quantities of isooctane. The complex thus produced had a viscosity less than that of an S. A. E. 50 lubricating oil and it could be easily pumped through pipes, towers or any form of contacting equipment. The complex contained approximately 35% by weight of "bound" hydrocarbons. A complex catalyst was also prepared by the action of anhydrous aluminum chloride on a light naphtha fraction rich in straight-chain paraffin hydrocarbons at a temperature above 200° F., which temperature is necessary in order that the complex may be formed in a reasonable time. Throughout the specification and claims, the term "aluminum halide-paraffinic hydrocarbon complex," or similar expression, is intended to designate a catalyst of the above-described characteristics made by the above or analogous methods.

The active liquid aluminum halide-hydrocarbon complex is particularly useful in reactions involving the production of branched-chain from straight-chain paraffin hydrocarbons, although it can also be used in the alkylation of isobutane or isopentane, or of aromatics with normally gaseous olefins and for the catalytic polymerization of normally gaseous olefins under suitable conditions. In one of its most important aspects my invention comprises contacting an admixture of a substantially saturated naphtha rich in straight-chain paraffin hydrocarbons, an active liquid aluminum halide-hydrocarbon complex prepared from a highly branched-paraffin hydrocarbon as described above and an activator affording a hydrogen halide under the reaction conditions in a reaction zone maintained at a temperature in the range from about 100° F. to about 450° F. and a superatmospheric pressure sufficient to maintain the naphtha largely in the liquid phase, preferably using a high hydrogen pressure. Under these conditions a large proportion of the straight-chain paraffin hydrocarbons in the naphtha are converted to branched-chain paraffin hydrocarbons and a fraction rich in branched-chain paraffin hydrocarbons comprising a high antiknock motor fuel fraction is separated from the products. This process is referred to herein as "isomerization," although some changes in molecular weight occur simultaneously with the molecular rearrangement.

The feed stock to the isomerization process can be any substantially saturated naphtha rich in straight-chain paraffin hydrocarbons. For example, it can be a relatively pure, normally liquid straight-chain paraffin hydrocarbon such as normal pentane or normal hexane, but generally predominantly straight-run naphthas such as those from Michigan, Pennsylvania or Mid-Continent crude oil are preferred since they are much more readily available. Another excellent feed stock is the highly paraffinic naphtha produced by the Fischer-Tropsch process from carbon monoxide and hydrogen. Natural gasoline fractions and so-called "distillates" are also suitable and are plentiful and inexpensive in some production areas. It is very important that the feed stock be free or almost free from aromatic hydrocarbons since they have been found to reduce the activity of the catalyst to a very marked degree, and consequently to limit seriously the amount of conversion obtained per unit weight of catalyst. The preferred feed stock therefore contains less than about 5% and preferably not more than 0.5 to 2.0% of aromatic hydrocarbons. In many cases a preliminary solvent extraction step or other treatment is necessary or desirable to reduce the aromatic content of the feed. Olefinic hydrocarbons are also undesirable and should not be present in more than very small amounts, while cyclo-paraffinic or naphthenic hydrocarbons can be tolerated in considerable quantities. Nevertheless, the feed stock should preferably contain at least 50% of paraffin hydrocarbons and those containing at least 80% of paraffin hydrocarbons are especially desirable.

In general the naphtha feed stock can have a boiling range within the range from about 50° F. to about 500° F., although naphthas having an initial boiling point as low as about 30° F. and including about 25% to 30% by weight of butanes can be used. A particularly suitable naphtha feed is one prepared by the distillation and fractionation of a straight-run or natural gasoline stock to produce a light naphtha having an initial boiling point in the range from about 30° F. to about 90° F. or higher and 95% point in the range from about 145° F. to about 180° F., preferably less than 170° F. and most advantageously about 150° F. Substantially all of the aromatic hydrocarbons and most of the naphthenic hydrocarbons such as cyclohexane are excluded from this fraction and it is very rich in straight-chain paraffin hydrocarbons. Under special circumstances it may be desirable to use a light naphtha fraction boiling within a still narrower range.

The concentration of aluminum halide-hydrocarbon complex catalyst present in the reaction zone can vary within wide limits depending primarily upon the temperature, reaction time and catalyst activity. Generally the catalyst concentration will be within the range from about 5% to about 30% by weight of the liquid hydrocarbons present for batch processes, based on the aluminum halide content of the complex, up to 200% or higher for continuous operation in a tower or similar reactor, although larger or smaller amounts can be used if the other conditions are controlled in accordance therewith. It will be understood that the actual catalyst consumption will be considerably lower since the complex retains its activity for a considerable period of time and is preferably recycled to the reaction zone. Actually, the catalyst consumption may be within the approximate range of 0.4 to 4.0 pounds per barrel of feed, usually about 1 or 2 pounds per barrel. If, on the other hand, a tower reactor or similar equipment employing a deep pool of catalyst is used, the catalyst concentration at any given moment will be manyfold greater, but the actual catalyst consumption will be of the same order of magnitude.

The activator supplied to the reaction zone is a substance affording a hydrogen halide under the conditions prevailing therein, which can be either a hydrogen halide itself such as hydrogen chloride or hydrogen bromide, or it can be one of the alkyl halides such as methyl chloride or bromide, ethyl chloride or bromide, etc. In general, the chlorinated and brominated hydrocarbons, particularly the more volatile ones, are suitable, and even water can be used since a hydrogen halide will be generated therefrom by reaction with the catalyst, but this is not preferred since the catalyst is thus deactivated more rapidly than would otherwise be the case. Chlorine or bromine can also be employed as an activator since, under the reaction conditions, the corresponding hydrogen halide and alkyl halides will be formed. Preferably the amount of activator used is sufficient to supply a concentration in the reaction zone within the range from about 0.1% to about 15.0% by weight, based on the reacting hydrocarbons present, preferably in the range from about 2% to about 10%. The activator used in the preparation of the complex catalyst can be any of those indicated above, with the exception of water, which is undesirable for the reasons pointed out. Hydrogen chloride, however, is the preferred activator in all cases because of its availability and low cost.

The isomerization reaction is preferably carried out in the presence of free hydrogen for the reason that the hydrogen greatly assists in increasing the yield of valuable hydrocarbon products per unit weight of catalyst. In this case the hydrogen is supplied under a pressure in the range from about 250 to about 3000 pounds per square inch and preferably at a pressure in the range from about 500 to about 1500 pounds per square inch. Relatively pure hydrogen is, of course, particularly suitable but in the plant operation of my process hydrogen containing impurities such as methane is often available at much lower cost and can be used effectively as long as the hydrogen content of the gas is above about 50 mol percent, in which case the hydrogen pressure previously mentioned would be the hydrogen partial pressure rather than the total gas pressure. It is also preferred that the hydrogen should be largely dissolved in the naphtha, particularly when my process is operated on a continuous basis. Generally the amount of free hydrogen present is less than about 100 volumes of gaseous hydrogen measured at 60° F. and atmospheric pressure per volume of liquid naphtha and preferably it lies in the range from about 10 to 25 volumes of hydrogen per volume of naphtha, although under some circumstances smaller amounts can be used.

Another important variable which influences the course of the reaction is temperature. In general, temperatures ranging from about 100° F. to about 400° F. are suitable, although different reaction times and amounts of catalyst are almost imperative in order that economically practicable results may be obtained at various temperatures. Usually I prefer to carry out the reaction in the range from about 200° F. to about 300° F., and still more preferably in the general vicinity of 250° F., in order that it may proceed rapidly and without drastic overtreatment. In the upper portion of the broad temperature range specified the tendency toward decomposition into normally gaseous hydrocarbons such as isobutane can be inhibited by supplying a relatively small quantity of one of the butanes to the reaction zone.

It is apparent that the isomerization process above described can be carried out either batchwise or continuously, although I greatly prefer continuous concurrent flow of the naphtha feed and the active liquid aluminum halide-hydrocarbon complex catalyst. Certain portions of the apparatus can be constructed of corrosion-resistant material to prevent rapid deterioration thereof from active halogen compounds present. Many suitable types of apparatus can be designed readily by one skilled in the art, but my invention will be described in detail in connection with only one of these as illustrated in the drawing to which reference is now made, the drawing being a simple flow diagram of one form of suitable apparatus.

The naphtha feed is introduced into the system by means of pump 10 and line 11 and passes into mixing chamber 12 in which it is mixed with a gaseous activator such as hydrogen chloride or chlorine supplied by pump 13 through line 14. In the arrangement shown, only that portion of the activator which dissolves in the naphtha is allowed to escape from chamber 12 and in the case of hydrogen chloride this is sufficient, as shown by the following data on the solubility of hydrogen chloride in a light naphtha at various temperatures and pressures:

*Table I*

| HCl pressure | Weight per cent HCl in light naphtha | | |
|---|---|---|---|
| | 58° F. | 215° F. | 336° F. |
| 8 lbs./in.² | 0.4 | | |
| 25 lbs./in.² | | | 0.35 |
| 35 lbs./in.² | | 0.8 | |
| 85 lbs./in.² | 8.3 | 2.0 | |
| 135 lbs./in.² | | | 2.3 |
| 150 lbs./in.² | 14.4 | | |
| 185 lbs./in.² | | 5.3 | |
| 195 lbs./in.² | 22.6 | | |
| 205 lbs./in.² | | | 3.9 |

Excess hydrogen chloride can be eliminated through line 15 having pressure release valve 16 therein and discarded by opening valve 17 in line 18 but, preferably, is recycled by opening valve 19 in line 20 which joins line 14. The activator can also be mixed directly with the feed stock or otherwise introduced into the system and these methods are, of course, used in connection with normally liquid activators. When very high pressures are to be used in carrying out the isomerization reaction, the pressure in chamber 12 is preferably maintained in an intermediate range, for instance 200 to 300 pounds per square inch or less. This pressure is controlled so as to supply enough activator to give the desired concentration when considered with the activator in the recycle streams described below.

The naphtha containing dissolved activator is passed through pump 21 and lines 22 and 23 into reaction zone 24 which, as shown, can be a vertical tower maintained at the desired reaction temperature. When the reaction is initiated, this reactor may be about half filled with an aluminum halide-hydrocarbon complex of the type described. A pressure vessel, including stirring equipment, can be substituted for the tower, or a tubular reactor with direct or indirect heating means can be used. The liquid aluminum halide-paraffinic hydrocarbon complex prepared as hereinabove described is supplied to line 23 by means of pump 26 and lines 27 and 28 in amounts sufficient to replace the withdrawn catalyst, and when hydrogen is used, as we prefer, it is likewise introduced into line 23 through compressor 29 and lines 30 and 31.

The entire reaction mixture from coil 25 passes through line 32 and cooler 33 to separator 34 in which the aluminum halide-paraffinic hydrocarbon complex settles out as a lower layer and is continuously withdrawn through line 35. This complex, or a major part thereof, is preferably recycled to line 28 by opening valve 36 in line 37 having pump 38 therein, and thence to reactor 24 through line 23. If desired, a portion of the complex can be withdrawn through valve 39 and line 40 and discarded. The complex can, of course, be treated to recover the aluminum halide therefrom and the aluminum halide thus recovered used to make more complex and reintroduced into the system through line 27; or a portion thereof can be treated with water or otherwise to furnish hydrogen halide for use as an activator in the process. Rather than pass the entire reaction mixture to separator 34, it is often desirable to combine the separator and reactor in one tower. Catalyst complex is allowed to settle from the reaction products in the top of the tower, and if desired, the upper portion of the tower can be enlarged to provide increased settling area. When using a tower of this type, catalyst draw-off lines similar to those shown for separator 34 will be supplied at the base of tower 24. An additional settler can also be used with a tower of this type into which the reaction products are directed, and from which dissolved and occluded catalyst is recovered for recycle.

After the complex has been used for some time for the conversion of hydrocarbons to a branched-chain configuration, it becomes very viscous and therefore very difficult to pump. In a great many instances, however, the inherent activity of the catalyst is as high or higher than the fresh catalyst introduced into the system, particularly if an isoparaffinic hydrocarbon were used to form the complex, and it is desirable to treat the spent catalyst in such a manner that it can be returned to the reaction zone rather than to be disintegrated into its aluminum chloride and hydrocarbon components or used for the production of hydrogen chloride. I have found that the fluidity of the catalyst can be successfully restored without too great impairment of the catalytic activity by treating the withdrawn complex with an additional amount of hydrocarbon such as isooctane or other paraffinic naphtha, particularly those having more than six carbon atoms per molecule, preferably in the presence of a hydrogen halide activator and preferably in the substantial absence of hydrogen. This can be accomplished by directing at least a part of the withdrawn complex from line 35 through line 41 and valve 42 to a regeneration system, valve 36 in line 37 being closed or valves 36 and 42 being so adjusted as to permit the recycle of a part of the catalyst and the regeneration of the remainder. The viscous complex is led from line 41 through line 43 to regenerator 44. Fresh isooctane or other paraffinic hydrocarbon of this type is introduced into line 43 via line 45, and hydrogen halide, such as hydrogen chloride added from line 46. A pump 47 and a heater 48 in line 41 serve to introduce the viscous catalyst at the proper temperature and pressure into regenerator 44. The mixture is preferably maintained at a temperature below that used in the isomerization reaction and can be within the range from about 100° F. to about 250° F., preferably about 120° F. to about 150° F., and the pressure may be the vapor pressure of the reactants, including the partial pressure of the hydrogen halide at that temperature, or may be atmospheric pressures only. The time of contact to be employed in the regeneration will vary according to a number of factors including the temperature, the ratio of fresh naphtha to the complex to be regenerated, and also the condition of the complex as regards viscosity and degree of degradation. Generally speaking, the time during which the catalyst complex will be in contact with the regenerating hydrocarbons will lie within the range from about 10 minutes to about 12 hours and usually within the range from about 1 hour to about 5 hours. An excess of isooctane or similar paraffinic hydrocarbon can be used since it will be recovered and can be recycled.

The mixture of catalyst, naphtha and hydrogen chloride passes from regenerator 44 via line 49 to separator 50 which is maintained at a pressure lower than that in regenerator 44. If desired, a cooler (not shown) can be installed in line 49 to reduce the temperature of the reactants prior to separation. The light gases, which will comprise chiefly hydrogen chloride, pass overhead through line 51 and can be discarded by opening valve 52 in line 53 or recycled by opening valve 54 in line 55 which joins line 46. The unreacted liquid hydrocarbons are withdrawn from the upper portion of separator 50 via line 56 and can be discarded by opening valve 57 in line 58 or recycled through valve 59 and line 60 to naphtha input line 45. The regenerated catalyst is withdrawn through line 61 and can be sent to storage or elsewhere by opening valve 62 in line 63. Preferably, however, it is recycled to the isomerization reaction by opening valve 64 in line 65 which joins line 27.

In order to obtain a more complete regeneration it may be desirable to recycle the separated reactivated catalyst to the regeneration step to permit further contact with the isooctane or other liquid hydrocarbon feed, and this can be done by opening valve 66 in line 67 which joins line 43. Usually the most advantageous procedure will be to recycle a portion of the reactivated catalyst to the regenerator and direct the remainder to the isomerization reactor, valves 64 and 66 being adjustable for this purpose.

As an alternative means of regeneration, the spent catalyst can be first treated with hydrogen and then contacted separately with isooctane or light naphtha at the temperatures and pressures previously described. To carry this out valve 69 in line 41 can be closed and valve 70 in line 71 opened, thereby directing the spent catalyst from line 41 and hydrogen from line 68 into hydrogen regenerator 72. This regenerator is maintained at temperatures within the range from about 200 to about 500° F. and at pressures within the range from about 500 to about 2000 pounds per square inch. This step in the regeneration removes a large portion of the high molecular weight hydrocarbons from the complex and leaves the complex in a very active but still viscous state. The hydrogen and complex pass from regenerator 72 through line 73 and cooler 74 to separator 75 in which, if desired, the hydrogen is separated as a gas by being flashed off at lower pressures, pressure release valve 76 in line 73 being installed for that purpose. The hydrogen passes overhead through line 77 and can be discarded through valved line 79 or recycled by opening valve 80 in line 81 which rejoins line 68. The high molecular weight hydrocarbons removed from the complex during this operation can be withdrawn through valved line 82 and discarded from the system. The partially regenerated catalyst, which is now in a very active but very viscous condition, is withdrawn from separator 75 through line 83 which joins line 43 leading to regenerator 44 wherein the previously described regeneration with isooctane or light naphtha is carried out.

To return to separator 34, the remainder of the product therein consists essentially of free hydrogen (if that substance has been supplied to the reaction), hydrogen halide, naphtha rich in branched-chain paraffinic hydrocarbons, and possibly some normally gaseous paraffins such as isobutane formed during the reaction. These are allowed to stratify in separator 34 so that a gaseous phase forms above the liquid hydrocarbon layer. When hydrogen has been used the pressure within separator 34 is preferably maintained as close to the reaction pressure existing within tower 25 as possible, although it is obvious that there will be some pressure drop in transferring the reactants from tower 25 to separator 34. In this case the temperature of separation depends to a very considerable extent upon the character of the feed stock and the pressure, but generally it will lie within the range from about 50° F. to about 150° F. Under such conditions very substantial quantities of free hydrogen formerly in solution are released as a gas. This hydrogen-rich gas is withdrawn from the top of separator 34 through line 84 and returned to the reaction zone 24 by opening valve 85 in line 86 which joins line 23. If hydrogen has not been used, however, the pressure in separator 34 is preferably substantially reduced and the temperature maintained at a somewhat higher value so that the gases recycled through line 86 will consist essentially of gaseous paraffins such as isobutane together with some activator. Alternately, the gaseous hydrocarbons can be vented by opening valve 87 in line 88. Alternately, if separator 80 is used as a "settler" rather than a separator, only dissolved or entrained catalyst will be removed therefrom and withdrawn through line 35.

The hydrocarbon layer is removed from separator 34 through line 89 and introduced into hydrogen chloride stripper 90 through pressure release valve 91 and heater 92. The hydrogen chloride dissolved in the naphtha is stripped out by application of heat from heater 92 and by heating means 93 in stripper 90 and taken overhead through line 94 from which it can be discarded by opening valve 95 in line 96 or recycled by opening valve 97 in line 98 which leads to hydrogen chloride input line 14. The substantially hydrogen chloride-free hydrocarbons are withdrawn from the lower portion of activator-stripper 90 through line 99 and the remaining traces of acidic gas as well as catalyst are removed in caustic scrubber 100, the dilute caustic entering through line 101 and being discharged through line 102.

From caustic scrubber 100 the hydrocarbons pass to fractionator 103 via line 104. Fractionating tower 103 can be of any conventional design and as shown is provided with a side stream line 105 for the withdrawal of those hydrocarbons having the desired boiling range. If it is desired to remove a closely selected high antiknock fraction such as a fraction rich in neohexane, this can be done via line 105 and the heavier hydrocarbons, which will contain considerable amounts of unconverted naphtha, withdrawn via line 106 and valve 107 and recycled to the isomerization reaction through line 108 which joins naphtha input line 11. Hydrocarbons substantially heavier than the initial feed naphthas can be withdrawn by opening valve 109 in line 110. The more volatile material passes overhead from fractionator 103 and can be discarded through valved line 111. If the gas stream contains considerable quantities of isobutane, these may be recycled to the reaction zone by opening valve 112 in line 113 in accordance with the procedure hereinafter described.

Small amounts of normal butane or isobutane can be supplied to the reaction zone 25 when the reaction temperature is relatively high, for instance within the range from about 300° F. to about 400° F., and this can be done by means of pump 114, line 115, valve 116 and lines 117 and 23. Generally, however, this expedient will be unnecessary when the operation has been carried out for a period of time since sufficient isobutane will be available through line 113 to act as an inhibitor effective in suppressing the formation of further quantities of isobutane. When this quantity of isobutane has been obtained, the excess normally gaseous hydrocarbons should be vented through line 111 and only that amount necessary to suppress the formation of further quantities of normally gaseous hydrocarbons recycled through line 113.

The regeneration step described herein should not be confused with a mere dilution of the viscous aluminum chloride-paraffinic hydrocarbon complex, since it appears from experimental data that treatment of the complex under these conditions results in the formation of additional quantities of complex rather than a mere reduction in viscosity by the addition of a lighter oil. Although I do not intend to be bound by any particular theory as to why such regeneration is effective, it is my belief that during the conversion of the hydrocarbons a certain proportion of the aluminum chloride-hydrocarbon complex is reduced to free aluminum chloride which is dissolved or carried along in the complex, and that by treating this complex with its dissolved aluminum chloride under the conditions and with the paraffinic hydrocarbons above described, particularly at lower temperatures and pressures and in the substantial absence of hydrogen, additional quantities of complex are formed from the free aluminum chloride in the complex. When using hydrogen for pre-regeneration, it is probable that there is elimination of higher molecular weight hydrocarbons from the complex, and additional quantities of free aluminum chloride are formed which, when contacted under the described conditions with the isooctane or paraffinic naphtha, form a much less viscous complex than was withdrawn from the isomerization reactor. There apparently is no limit to the number of times such a regeneration can be carried out providing, of course, that the conditions in the reaction zone are such that little or no "coking" of the complex takes place. In the case of a hydrocarbon conversion process carried out at the temperatures specified herein, the amount of coking will be practically nil. By thus regenerating the spent complex it is possible to prolong the catalyst life to a very considerable extent at no further cost of materials than that of the paraffinic hydrocarbons used for the regeneration reaction.

It is apparent from the above that I have described a novel method of isomerizing paraffinic naphthas of low octane number to produce high antiknock motor fuel fractions by the use of a liquid aluminum halide-paraffinic hydrocarbon complex particularly adapted to continuous plant operation, and a simple and most effective means of regenerating or reactivating the spent aluminum halide-hydrocarbon complex after it has become too viscous for proper utilization in a continuous system.

Although I have illustrated one embodiment of my invention, it should be understood that it is by way of illustration only and not by way of limitation and that other means may be equally well employed for carrying out my reaction. Also, for the sake of simplicity, various details have been omitted, such as heat exchangers, automatic controls, compressors, pumps, etc. the need for which will be readily understood by one skilled in the art and will be supplied by one wishing to practice my invention.

I claim:

1. In an isomerization process for the conversion of straight-chain hydrocarbons to branched-chain hydrocarbons employing an aluminum halide-paraffinic hydrocarbon complex as a catalyst wherein said complex increases substantially in viscosity with use, the improvement comprising contacting said viscous catalyst with a substantially saturated hydrocarbon fraction in the presence of an activator affording a hydrogen halide under the reaction conditions at a temperature within the range from about 100° F. to about 250° F. at superatmospheric pressure for a time sufficient to reduce substantially the viscosity of said viscous complex, and returning the treated complex to said isomerization process.

2. In an isomerization process for the conversion of straight-chain hydrocarbons to branched-chain hydrocarbons employing an aluminum halide-paraffinic hydrocarbon complex as a catalyst wherein said complex increases substantially in viscosity with use, the improvement comprising contacting said viscous catalyst with a substantially saturated hydrocarbon fraction having more than six carbon atoms per molecule in the presence of an activator affording a hydrogen halide under the reaction conditions at a temperature within the range from about 100° F. to about 250° F. and at the vapor pressure of the reactants at said temperature for a time sufficient to reduce substantially the viscosity of said viscous complex, and returning the treated complex to said isomerization process.

3. In an isomerization process for the conversion of straight-chain hydrocarbons to branched-chain hydrocarbons employing an aluminum halide-paraffinic hydrocarbon complex as a catalyst wherein said complex increases substantially in viscosity with use, the improvement comprising contacting said viscous catalyst with hydrogen at a temperature within the range from about 200° F. to about 500° F. and at a pressure within the range from about 100 to about 200 pounds per square inch, recovering said viscous complex from said hydrogen contacting step, thereafter contacting said recovered viscous complex with a substantially saturated hydrocarbon fraction in the presence of an activator affording a hydrogen halide under the reaction conditions at a temperature within the range from about 100° F. to about 250° F. at the vapor pressure of the reactants at that temperature for a time sufficient to reduce substantially the viscosity of said viscous complex, and returning the treated complex to said isomerization process.

4. A process for the production of branched-chain hydrocarbons which comprises contacting a substantially saturated naphtha rich in straight-chain hydrocarbons with an active aluminum halide-paraffinic hydrocarbon complex and an activator affording a hydrogen halide under the reaction conditions under a partial pressure of hydrogen within the range from about 250 to about 3000 pounds per square inch at a temperature within the range from about 100° F. to about 450° F. for a time sufficient to promote the conversion of at least a substantial part of said straight-chain saturated hydrocarbons in said naphtha to saturated branched-chain hydrocarbons and to increase the viscosity of said complex a substantial amount, separating said viscous complex from said hydrocarbons, contacting said separated complex with an excess of a substantially saturated isoparaffinic hydrocarbon fraction and with an activator affording a hydrogen halide under the reaction conditions, at a temperature within the range from about 100° F. to about 250° F. at superatmospheric pressure whereby the viscosity of said separated complex is substantially reduced, recovering said complex of reduced viscosity from the reactants and returning said recovered complex to said first-mentioned contacting step.

5. In an isomerization process for the conversion of straight-chain hydrocarbons to branched-chain hydrocarbons employing an aluminum halide-paraffinic hydrocarbon complex as a catalyst wherein said complex increases substantially in viscosity with use, the improvement comprising contacting said viscous catalyst with at least one isoparaffin hydrocarbon in the presence of an activator affording a hydrogen halide under the reaction conditions at a temperature and pressure effective for reducing substantially the viscosity of said viscous complex, and returning said complex to said isomerization process.

6. In an isomerization process for the conversion of straight-chain hydrocarbons to branched-chain hydrocarbons employing an aluminum halide-paraffinic hydrocarbon complex as a catalyst wherein said complex increases substantially in viscosity with use, the improvement comprising contacting said viscous catalyst with isooctane in the presence of an activator affording a hydrogen halide under the reaction conditions at a temperature and pressure effective for reducing substantially the viscosity of said viscous complex, and returning said complex to said isomerization process.

NATHAN FRAGEN.